(12) United States Patent
Tao et al.

(10) Patent No.: US 7,511,953 B2
(45) Date of Patent: Mar. 31, 2009

(54) DISK DRIVE CARRIER ASSEMBLY

(75) Inventors: Lang Tao, Shenzhen (CN); Li-Ping Chen, Tu-Cheng (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 204 days.

(21) Appl. No.: 11/309,399

(22) Filed: Aug. 4, 2006

(65) Prior Publication Data

US 2008/0055841 A1 Mar. 6, 2008

(51) Int. Cl.
*G06F 1/16* (2006.01)
*H05K 7/16* (2006.01)
(52) U.S. Cl. ...................................... 361/685; 361/726
(58) Field of Classification Search ................. 361/685, 361/724–727
See application file for complete search history.

(56) References Cited

U.S. PATENT DOCUMENTS

| | | | | |
|---|---|---|---|---|
| 5,588,728 A | * | 12/1996 | Eldridge et al. | 312/332.1 |
| 5,729,060 A | * | 3/1998 | Shih | 361/685 |
| 5,797,667 A | * | 8/1998 | Wu | 361/685 |
| 5,868,261 A | * | 2/1999 | Collins et al. | 211/26 |
| 5,921,644 A | | 7/1999 | Brunel et al. | |
| 5,959,834 A | * | 9/1999 | Chang | 361/726 |
| 5,975,735 A | * | 11/1999 | Schmitt | 361/685 |
| 6,058,016 A | * | 5/2000 | Anderson et al. | 361/685 |
| 6,233,143 B1 | | 5/2001 | Gamble et al. | |
| 6,288,902 B1 | * | 9/2001 | Kim et al. | 361/727 |
| 6,325,353 B1 | * | 12/2001 | Jiang | 361/685 |
| 6,356,441 B1 | * | 3/2002 | Claprood | 361/685 |
| 6,381,139 B1 | * | 4/2002 | Sun | 361/685 |
| 6,421,236 B1 | * | 7/2002 | Montoya et al. | 361/685 |
| 6,490,153 B1 | * | 12/2002 | Casebolt et al. | 361/685 |
| 6,498,723 B1 | * | 12/2002 | Konshak et al. | 361/685 |
| 6,603,657 B2 | * | 8/2003 | Tanzer et al. | 361/685 |
| 6,952,341 B2 | * | 10/2005 | Hidaka et al. | 361/685 |
| 2004/0012921 A1 | * | 1/2004 | Hidaka et al. | 361/685 |
| 2004/0190266 A1 | * | 9/2004 | Chung | 361/685 |
| 2005/0111180 A1 | * | 5/2005 | Song | 361/685 |
| 2005/0207108 A1 | * | 9/2005 | Chen | 361/685 |
| 2007/0211422 A1 | * | 9/2007 | Liu et al. | 361/685 |

\* cited by examiner

*Primary Examiner*—Anatoly Vortman
*Assistant Examiner*—Adrian S Wilson
(74) *Attorney, Agent, or Firm*—Wei Te Chung

(57) ABSTRACT

A disk drive carrier assembly includes a disk drive (80), a bracket (10), and a carrier (20). The bracket includes a pair of parallel side plates (11) with a slideway defined therebetween for guiding the disk drive in a direction parallel to the side plates into the bracket. A securing opening (118) is defined in one of the side plates. The carrier includes a tray (30) for receiving the disk drive. A handle (60) is pivotably attached to the tray at an axis parallel to the side plates. A stop (68) is formed on an end of the handle for engaging with the securing opening of the bracket. A locking member (75) is rotatably attached to a free end of the handle from an inner side thereof.

20 Claims, 8 Drawing Sheets

US 7,511,953 B2

DISK DRIVE CARRIER ASSEMBLY

FIELD OF THE INVENTION

The present invention relates to a carrier assembly, and more particularly to a disk drive carrier assembly which is used for holding a disk drive and mounting the disk drive to a bracket of a computer or related equipment.

DESCRIPTION OF RELATED ART

In a conventional method, a plurality of screws is used in installing/removing a disk to/from a computer or related equipment. This method substantially requires a long assembling time, and will produce vibrations when the screws are installed or removed. Subsequently a drive is mounted to a disk drive carrier. The drive carrier can help protect the drive from being damaged during installation.

A mounting tray is provided to enable the mounting of a drive unit. The conventional mounting tray includes two stepped side members provided with studs for engaging side fixing holes in the drive units. The side members are joined by a flexible member that allows the side members to be flexed out of a normal oppositely-facing configuration for engagement about the drive unit. However, it is not easy to remove the mounting tray from the computer when the drive unit needs to be changed, and it is not easy to mount the tray to the computer.

What is needed, therefore, is a carrier assembly for readily and easily mounting a drive disk to a bracket of a computer or related equipment.

SUMMARY OF THE INVENTION

A disk drive carrier assembly includes a disk drive, a bracket, and a carrier. The bracket includes a pair of parallel side plates with a slideway defined therebetween for guiding the disk drive in a direction parallel to the side plates into the bracket. A securing opening is defined in one of the side plates. The carrier includes a tray for receiving the disk drive. A handle is pivotably attached to the tray at an axis parallel to the side plates. A stop is formed on an end of the handle for engaging with the securing opening of the bracket. A locking member is rotatably attached to a free end of the handle from an inner side thereof.

Other advantages and novel features will be drawn from the following detailed description of a preferred embodiment with attached drawings, in which:

DETAILED DESCRIPTION OF THE INVENTION

Figure 1:
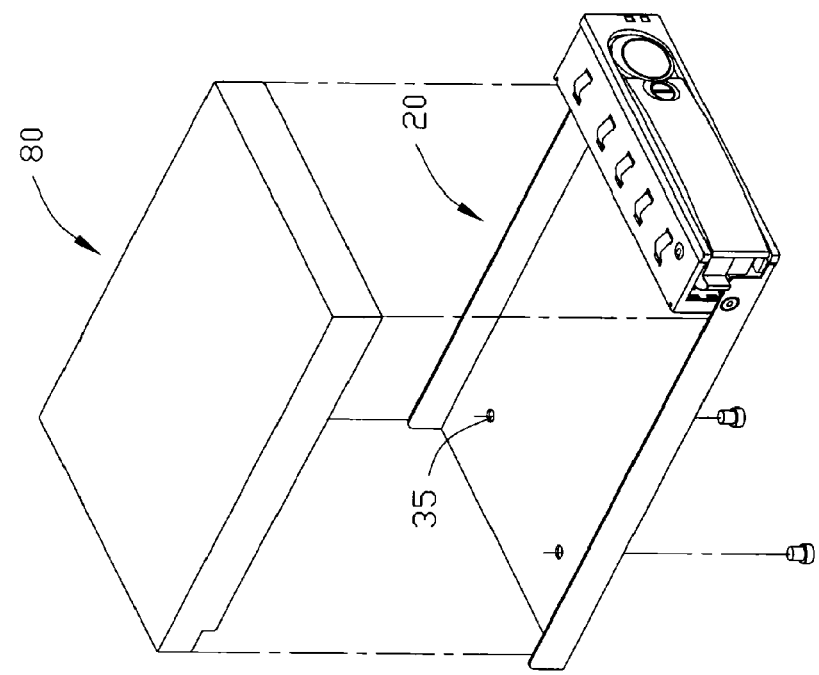
FIG. 1 is an exploded, isometric view of a disk drive carrier assembly for a disk drive of a preferred embodiment of the present invention, the assembly including a bracket, and a disk drive carrier.
Figure 1:
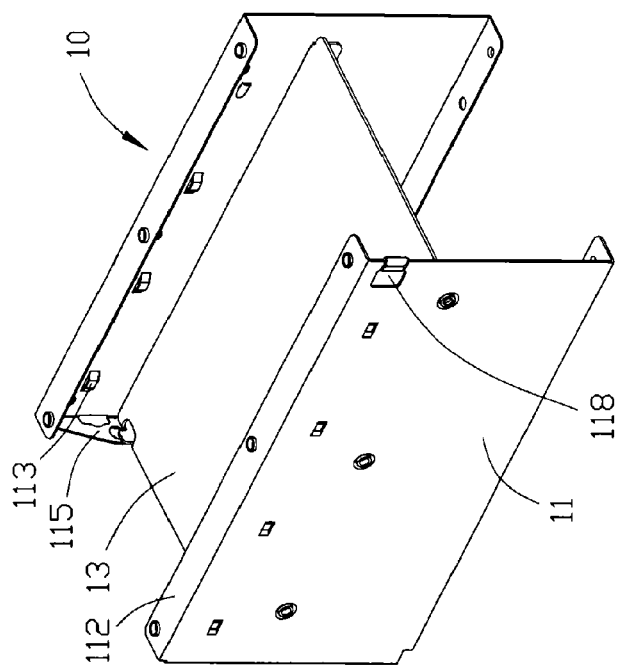

Referring to FIG. 1, a disk drive carrier assembly for mounting a disk drive 80 includes a bracket 10, and a disk drive carrier 20.

The bracket 10 includes a pair of parallel side plates 11, and an interlayer 13 being perpendicularly sandwiched therebetween. Each side plate 11 has a top flange 112 extending thereon. A plurality of guides 113 is formed in along a same horizontal line on each side plate 11 above the interlayer 13. A rear flange 115 extends along a back edge of the interlayer 13 from a back edge of each side plate 11. The two side plates 11, the top flanges 112, and the interlayer 13 form a slideway. A securing opening 118 is defined in a front side of one side plate 11 above the interlayer 13.

Figure 2:
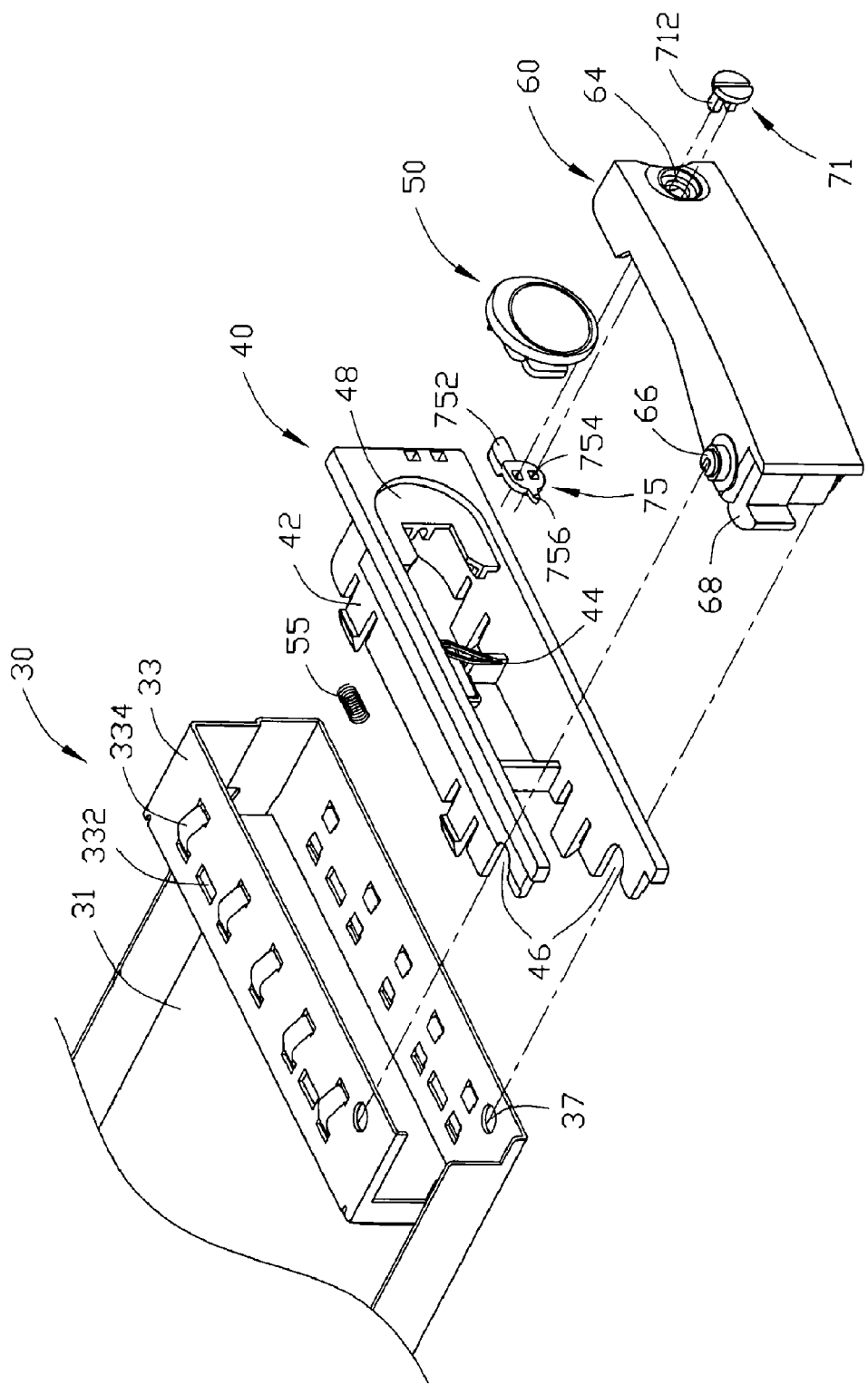
FIG. 2 is a partial, exploded, isometric view of the disk drive carrier of FIG. 1.

Referring also to FIG. 2, the disk drive carrier 20 includes a tray 30, a front panel 40, and a handle 60.

The tray 30 includes a disk drive holder 31, and a front receiver 33. The disk drive holder 31 has a pair of side walls. The holder 31 defines a pair of holes 35 therein for securing the disk drive 80 with fasteners such as screws. The front receiver 33 is made in a substantially U-shaped structure. The front receiver 33 includes a top wall and bottom wall. The structures of the top wall and the bottom wall are symmetrical. A plurality of spring clips 334 is buckled on each wall of the front receiver 33. A pair of openings 332 is defined in each wall. A pivoting hole 37 is defined in one side of each wall.

Figure 3:
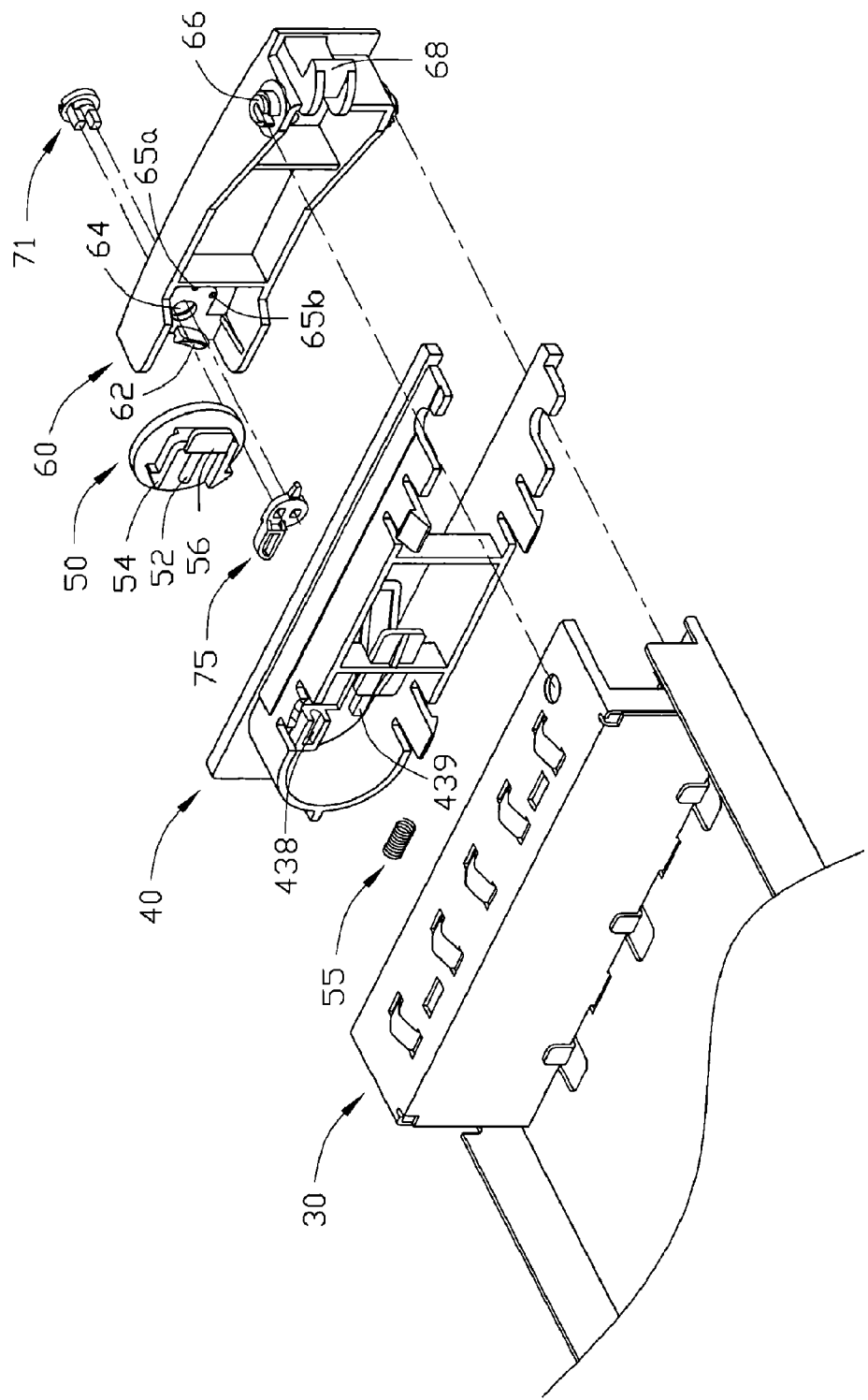
FIG. 3 is similar to FIG. 2, but viewed from another aspect.

Referring also to FIG. 3, the front panel 40 is formed for attaching to the front receiver 33. In an alternative embodiment, the front panel can be integrally formed with the tray. Two pairs of resilient hooks 42 are formed on the front panel 40 corresponding to the openings 332 of the front receiver 33. A pair of notches 46 is defined in the front panel 40 corresponding to the pivoting holes 37 of the front receiver 33. An elastic clip 44 is formed on the front panel 40 at a front side thereof. An operation channel 48 is defined in the front panel 40 for receiving a button 50. The button 50 is disk-shaped. A shaft 52 is formed on a back side of the button 50. A cavity 438 is defined in the front panel 40 for receiving the shaft 52. A pair of elastic barbs 54 is formed on the button 50 adjacent to the shaft 52 for securing with a pair of blocks 439 formed on the front panel 40. An extending tab 56 extends from the back side of the button 50. A coil spring 55 is provided for driving the button 50.

The handle 60 is pivoted to the tray 30 by means of a pair of pivot posts 66 corresponding to the pivot holes 37 of the tray 30. A hook-shaped stop 68 is formed on a left end of the handle 60 for engaging with the securing opening 118 of the bracket 10. A wedged protrusion 62 protrudes from a right end and inner side of the handle 60. A through hole 64 is defined at the right end of the handle 60 for positioning a lock 71. The lock 71 includes a pair of posts 712 at one side thereof. A locking member 75 is provided with a pair of post holes 754 defined therein for receiving the posts 712 of the lock 71. A finger 752 extends from the locking member 75 for engaging with the extending tab 56 of the button 50. A tail is formed at a side of the locking member 75. A positioning tab 756 protrudes from the tail corresponding to a first positioning access 65a and a second positioning access 65b, which are defined in the handle 60.

The disk drive 80 defines a pair of securing holes corresponding to the holes 35 for mounting to the tray 30. The disk drive 80 defines a plurality of I/O (Input/Output) ports at a back side thereof for communicating with a computer or sever.

Figure 4:
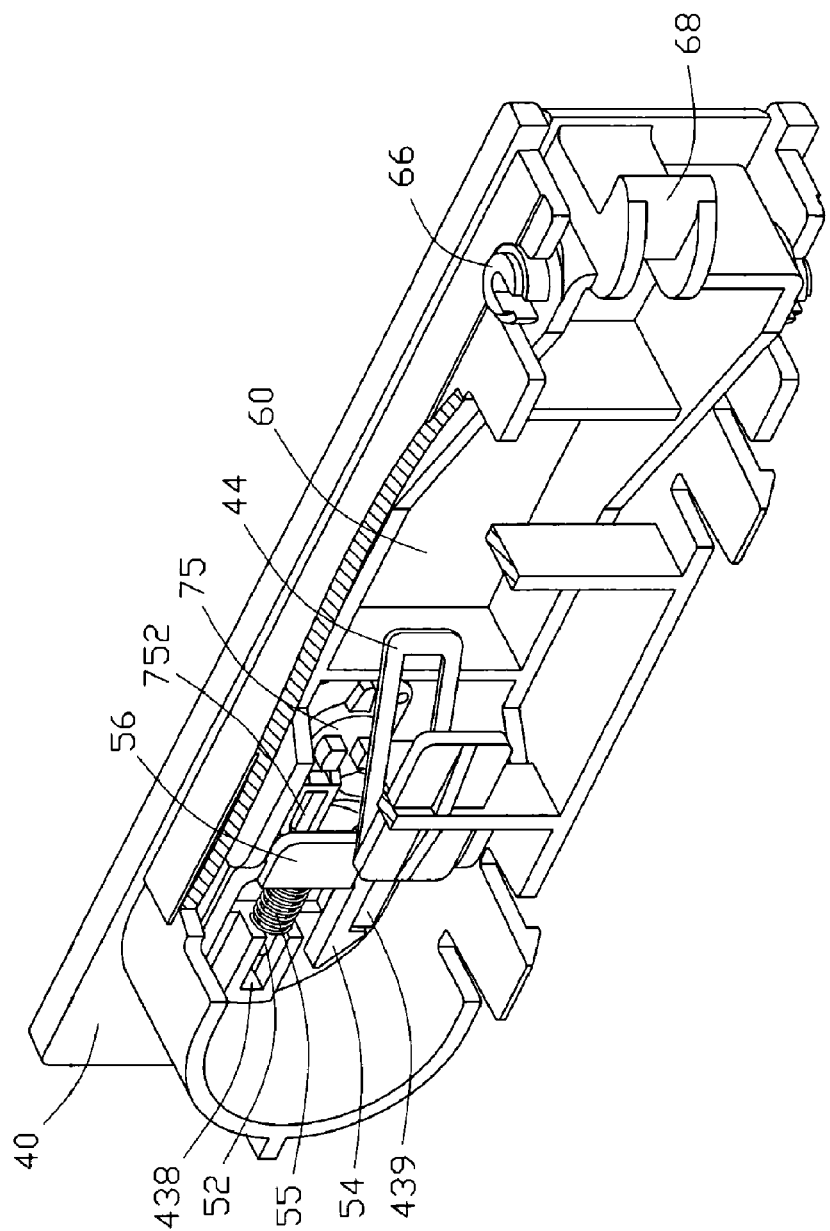
FIG. 4 is a partial, assembled, cutaway view of FIG. 3.

Referring also to FIG. 4, when assembling the disk drive carrier 20, the coil spring 55 is engaged onto the shaft 52 of the button 50. The button 50 is slid into the operation channel 48 of the front panel 40 with the shaft 52 inserted into the cavity 438 of the front panel 40 and the elastic barbs 54 hooking on each end of the blocks 439 of the front panel 40. The posts 712 of the lock 71 are respectively inserted into the post holes 754 of the locking member 75 through the through hole 64 of the handle 60, so that the locking member 75 is rotatable with the lock 71 at the through hole 64 of the handle 60. Then the hooks 42 of the front panel 40 are respectively engaged in the corresponding openings 332 of the tray 30, as the front panel 40 is pushed into the front receiver 33 of the tray 30. The pivot posts 66 are respectively received in the corresponding pivoting holes 37 of the tray 30. The locking member 75 is rotated up, where the positioning tab 756 of the locking member 75 is received in the second positioning access 65b of the handle 60.

Figure 5:
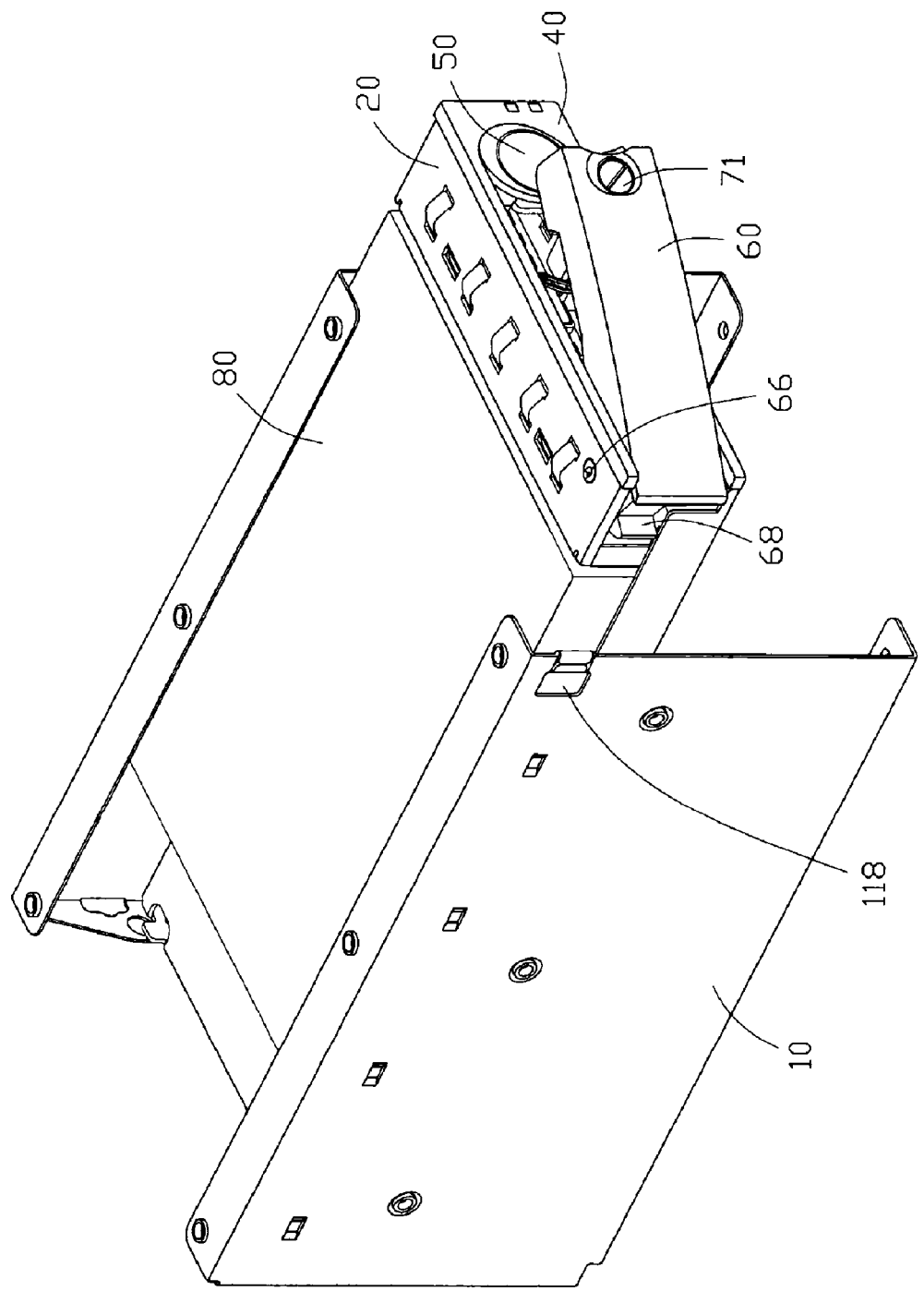
FIG. 5 is an isometric view of FIG. 1 before the disk drive carrier being assembled to the bracket.
Figure 6:
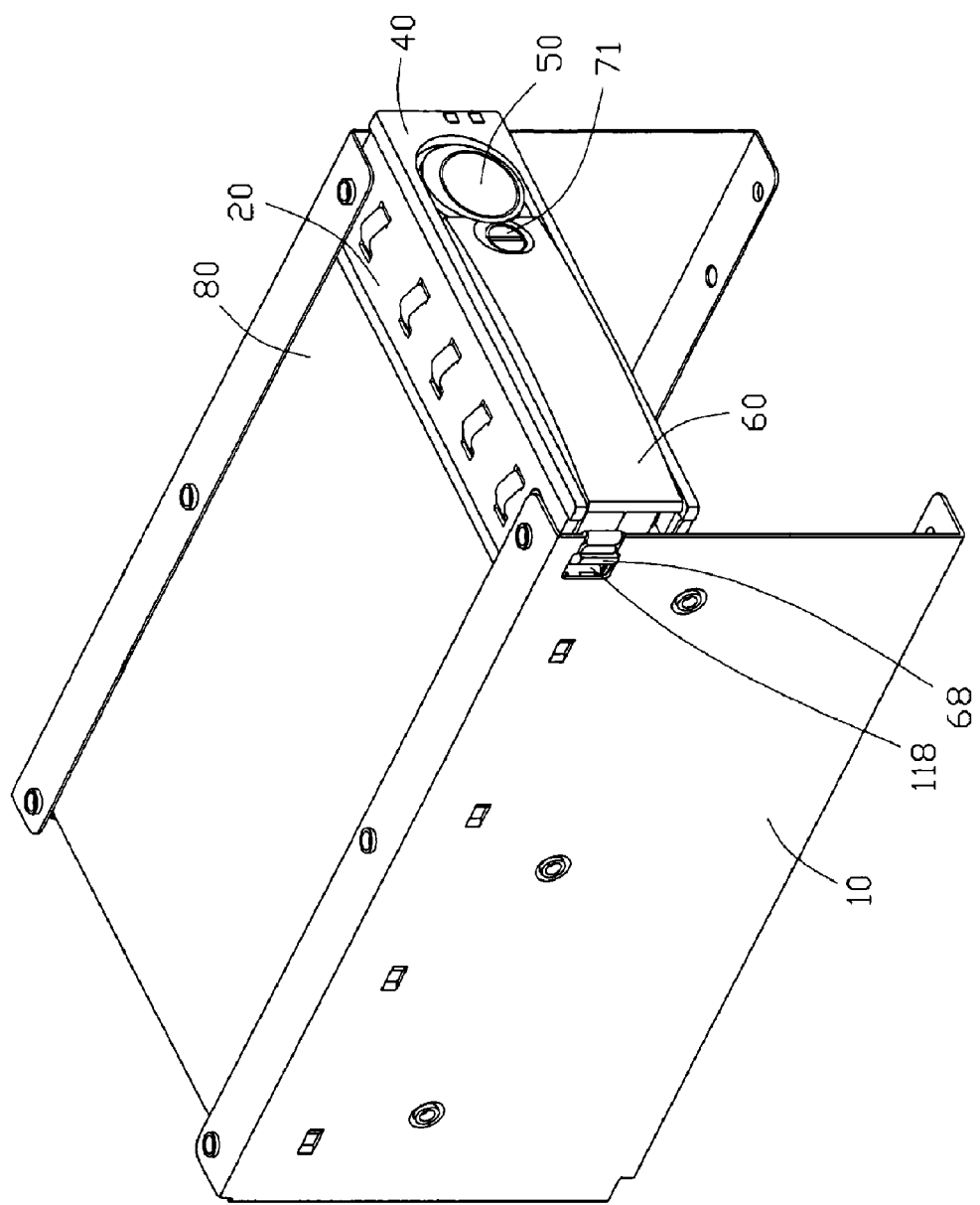
FIG. 6 is similar to FIG. 5, but the disk drive carrier is mounted to the bracket.

Referring also to FIG. 5 and FIG. 6, when assembling the disk drive 80 to the bracket 10, the disk drive 80 is fastened to the disk drive carrier 20 through the holes 35 thereof by a pair of fasteners. The assembly of the disk drive 80 and the disk drive carrier 20 are slid into the slideway of the bracket 10, until the disk drive carrier 20 abuts against the rear flanges 115 of the side plates 11. The stop 68 of the handle 60 is just aligned with the securing opening 118 of the bracket 10. The handle 60 is rotated to the front panel 40. When the wedged protrusion 62 abuts against an edge of the button 50 and urges the button 50 to move to a right end of the operation channel 48. The coil spring 55 is pressed by the button 50 and the front panel 40. Then the handle 60 is fully received into the front panel 40, the button 50 is released, and the button 50 slides back by rebounding of the coil spring 55. The edge of the button 50 blocks the protrusion 62 of the handle 60. The stop 68 is engaged in the securing opening 118 of the bracket 10. In this process, the elastic clip 44 is pressed down by a back side of the handle 60. The locking member 75 is rotated between the extending tab 56 and the edge of the button 50, until the positioning tab 756 of the locking member 75 is received in the first positioning access 65a of the handle 60. The disk drive 80 is thus assembled to the bracket 10.

Figure 7:
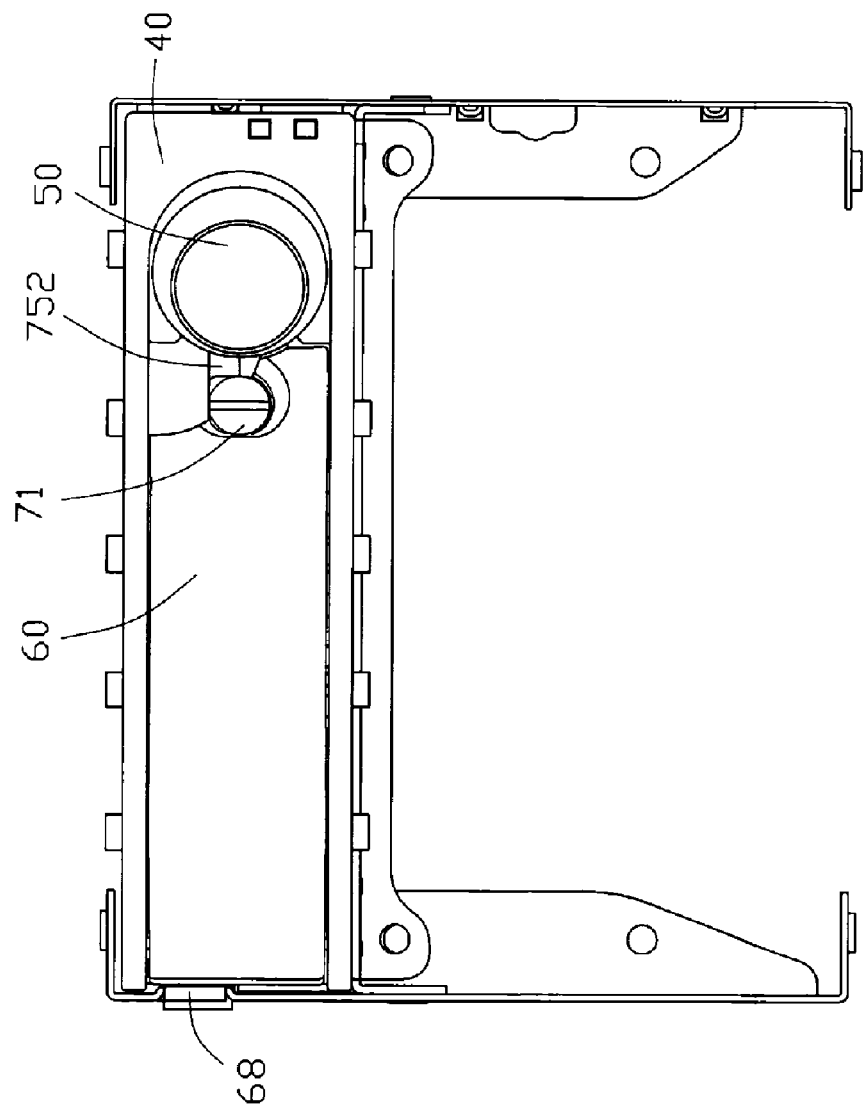
FIG. 7 is a cutaway, front view of FIG. 6.
Figure 8:
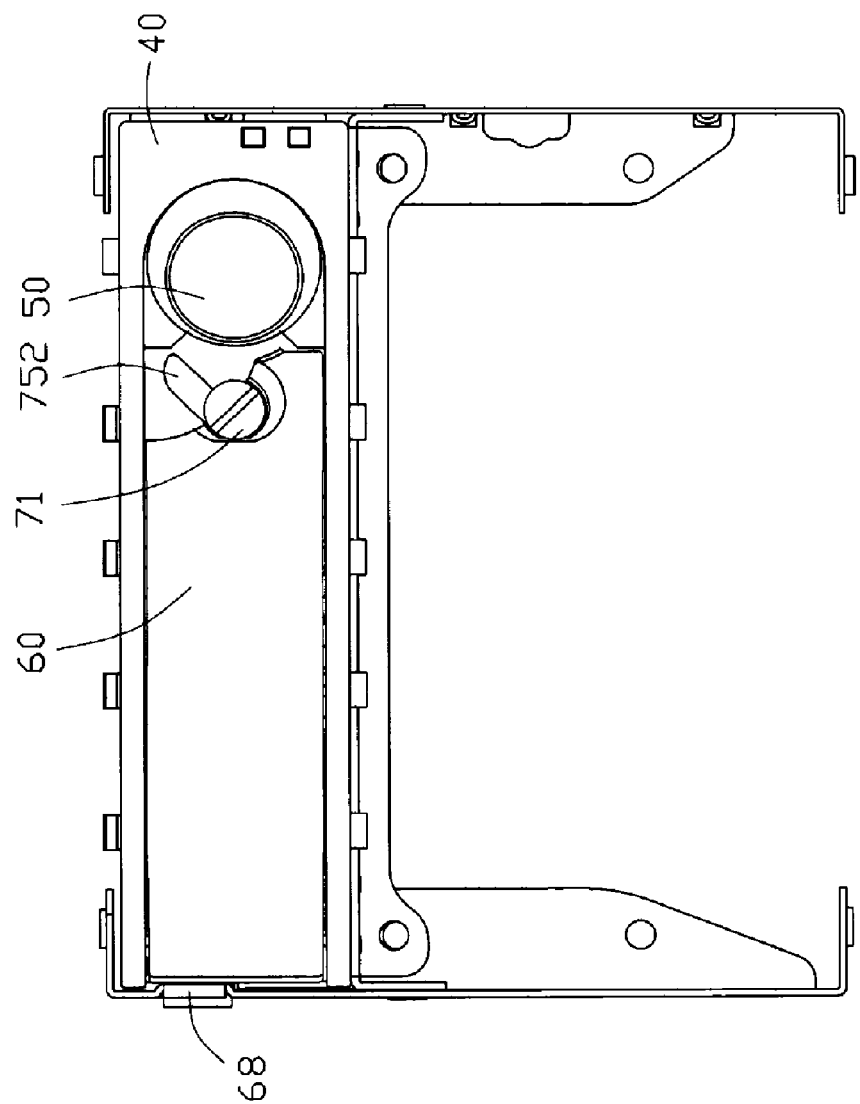
FIG. 8 is similar to FIG. 7, but a lock is in an unlocked position.

Referring also to FIG. 7 and FIG. 8, when releasing the disk drive 80, the lock 71 is rotated up, until the positioning tab 756 of the locking member 75 reaches the second positioning access 65b of the handle 60. Then the button 50 is pushed to the right end of the operation channel 48, and the edge of the button 50 releases the protrusion 62 of the handle 60. The handle 60 is rotated outwardly by rebounding of the elastic clip 44 of the front panel 40. The stop 68 is disengaged from the securing opening 118 of the bracket 10. The disk drive carrier 20 is removed from the bracket 10, so that the disk drive 80 is detached from the bracket 10.

It is to be understood, however, that even though numerous characteristics and advantages have been set forth in the foregoing description of a preferred embodiment, together with details of the structure and function of the preferred embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A disk drive carrier assembly, comprising:
   a disk drive;
   a bracket comprising a pair of parallel side plates with a slideway defined therebetween for guiding the disk drive in a direction parallel to the side plates into the bracket, a securing opening defined in one of the side plates; and
   a carrier comprising a tray for receiving the disk drive and a handle pivotably attached to the tray about a first axis parallel to the side plates, a stop formed on an end of the handle for engaging with the securing opening of the bracket, a locking member rotatably attached to a free end of the handle from an inner side thereof at a second axis perpendicular to the first axis, wherein the locking member is operable from an outer surface of the carrier, when the locking member is rotated from a first position, where the locking member is blocked by the tray, to a second position, where the locking member is disengaged from the tray, the free end of the handle is released, and the handle can be rotated away from the tray.

2. The carrier assembly as described in claim 1, wherein the tray comprises a front panel, and a front receiver for receiving the front panel.

3. The carrier assembly as described in claim 1, wherein an elastic clip is formed on the tray for urging the handle to pivot away therefrom.

4. The carrier assembly as described in claim 3, wherein when the free end of the handle is rotated away from the tray by rebounding of the elastic clip, the stop disengages from the securing opening of the bracket.

5. The carrier assembly as described in claim 1, wherein a finger is formed at a side of the locking member for being blocked by the tray.

6. The carrier assembly as described in claim 1, wherein a protrusion is formed on the free end of the handle, and a button is movably attached to the tray for engaging with the protrusion.

7. The carrier assembly as described in claim 6, wherein the button is disk-shaped, a channel is defined in the tray for receiving the button, and a coil spring is set between the button and the tray.

8. The carrier assembly as described in claim 7, wherein a shaft is formed at a back side of the button, and a cavity is defined in the tray for receiving the shaft, the coil spring is assembled to the shaft.

9. The carrier assembly as described in claim 8, wherein a lock for controlling the rotation of the locking member is set at a front side of the handle.

10. A disk drive carrier device for mounting a disk drive into a bracket, the bracket having a slideway for receiving the carrier device, the carrier device comprising:
    a tray configured for receiving the disk drive;
    a button slideably attached to a first end of the tray; and
    a handle pivotably attached to a second end of the tray opposite to the first end thereof, a protrusion formed on a free end of the handle engaging with an edge of the button capable of blocking the handle to diseneage from the button. and a locking member rotatably attached to the handle, and the locking member positioned between the tray and the handle, wherein the button is slideable away along a direction from the second end of the tray to the first end of the tray to disengage from the protrusion, and release the free end of the handle, when the locking member is rotated to a position between the button and the fray, the locking member is blocked by the button from being removed from the tray.

11. The carrier device as described in claim 10, wherein a stop is formed on the handle for mounting the carrier device to the bracket corresponding to a securing opening defined in the bracket.

12. The carrier device as described in claim 10, wherein the tray comprises a front panel, and a front receiver for receiving the front panel.

13. The carrier device as described in claim 10, wherein an elastic clip is formed on the tray for urging the handle to rotate away from the tray, when the handle is released from the button.

14. The carrier device as described in claim 10, wherein the button is disk-shaped, a channel is defined in the tray for receiving the button, and a coil spring is set between the button and the tray.

15. The carrier device as described in claim 14, wherein a shaft is formed at a back side of the button, and a cavity is defined in the tray for receiving the shaft, the coil spring is assembled to the shaft.

16. The carrier device as described in claim 10, wherein a finger is formed at a side of the locking member far being blocked by the button.

17. The carrier device as described in claim 10, wherein a lock for controlling the rotation of the looking member is set at a front side of the handle.

18. A disk drive carrier device for mounting a disk drive into a bracket, the carrier device comprising:
  a tray configured for receiving the disk drive therein and moving the disk drive into or out of the bracket;
  a handle pivotably mounted to a front side of the tray, the handle including a stop configured for engagement with the bracket in a manner so as to prevent the tray from moving away from the bracket when the handle pivots to a locked position, and a locking portion;
  a first locking member mounted to the front side of the tray, the first locking member being movable to an engaged position for engaging with the locking portion of the handle in a manner so as to secure the handle in the locked position, and a released position for releasing the locking portion; and
  a second locking member movably mounted to the handle, wherein the second locking member is movable between a first position where the second locking member engages with the first locking member in a manner so as to secure the handle in the locked position, and a second position where the second lacking member disengages from the first locking member, and wherein the handle is released from the locked position when the second locking member is in the second position and the first locking member is in the released position.

19. The carrier assembly as described in claim 9, wherein a locking member is provided with a pair of post holes defined therein capable of receiving the lock, a positioning tab protrudes from a tail of the locking member capable of engaging with the handle.

20. The carrier device as described in claim 12, wherein a pair of elastic bats is formed on the button, a pair of blocks is formed on the front panel capable of securing with the barbs.

* * * * *